(No Model.)
E. C. PECK.
VAPOR BURNER.
No. 329,481. Patented Nov. 3, 1885.
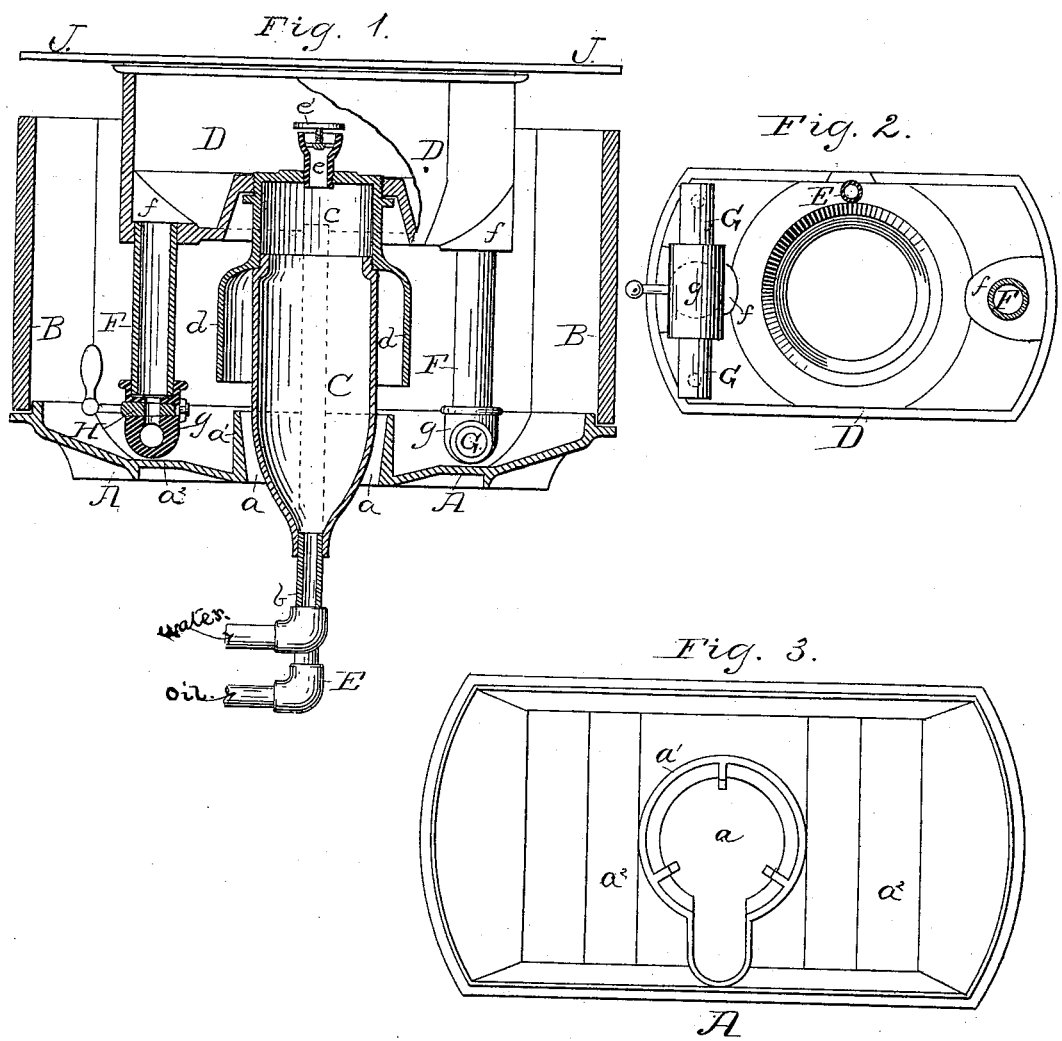
WITNESSES
Edward W. Schirach
Jno. W. Sickels
Edmond C Peck
INVENTOR
James H. Coyne
By Attorney

UNITED STATES PATENT OFFICE.

EDMOND C. PECK, OF CHICAGO, ILLINOIS.

VAPOR-BURNER.

SPECIFICATION forming part of Letters Patent No. 329,481, dated November 3, 1885.

Application filed April 21, 1885. Serial No. 162,893. (No model.)

*To all whom it may concern:*

Be it known that I, EDMOND C. PECK, of Chicago, in the county of Cook and State of Illinois, have invented certain new and useful Improvements in Vapor-Burners; and I do hereby declare that the following is a full, clear, and exact description of the invention, which will enable others skilled in the art to which it appertains to make and use the same, reference being had to the accompanying drawings, and to letters of reference marked thereon, which form a part of this specification.

The object of my invention is to provide a new and improved vapor-burner which thoroughly mixes the water and oil vapors generated therein, which is so constructed that it protects the heretofore exposed parts from the great heat to which they would otherwise be exposed, and in which the oil receiving, vaporizing, and vapor-mixing chamber is so constructed that the oil cannot escape into the water-vaporizing chamber connected therewith, and so that the vaporizing of the oil and the mixing of the same with the water-vapor are greatly facilitated, substantially as hereinafter described, and as illustrated in the drawings, in which—

Figure 1 is a longitudinal vertical section through the center of my improved vapor-burner. Fig. 2 is a plan view of the under side of the oil-vaporizing and vapor-mixing chamber, and Fig. 3 is a plan view of the drip-pan.

In the drawings, A represents a drip-pan having a central circular opening, $a$, which has a vertical wall, $a'$, rising from its circumference, to prevent the escape from the pan of the oil that may flow into it, as will be hereinafter more fully explained. This pan A is so constructed that its sides and bottom slope in toward the longitudinal center, thus massing the oil around the wall $a'$, arising from the edges of the central opening. The incline of the bottom of the pan is not continuous, but is broken by a transverse horizontal plane surface or step, $a^2$, the purpose of which will be explained further on. Projecting from the edges of the drip-pan is a horizontal flange, which forms a shoulder, on which the outer vertical casing, B, rests and is supported.

Extending centrally and vertically up through the opening $a$ of the drip-pan is the steam or water-vaporizing chamber C. This chamber C tapers toward its lower end, where a water-supply pipe, $b$, is connected to it. Its upper end is stepped to a less diameter—thus forming a shoulder—and the circumference of this stepped portion is screw-threaded, so as to screw into and connect with the upper part or cap, $c$, of chamber C. Depending and flaring outward from the lower edges of cap $c$ is the bell-shaped shield $d$, which is designed to protect the walls of chamber C from the damaging effects of the intense heat generated by the combustion within casing B. The circumference of cap $c$ contiguous to its closed top is screw-threaded, so as to screw into the apertures in the raised center of the bottom of the oil receiving and vaporizing and vapor-mixing chamber D. In the head of this cap $c$ is a tube, $e$, which affords an outlet into the mixing-chamber D for the water-vapor generated in chamber C. This tube $e$ is provided with a disk-shaped cap, $e'$, which is adjustable on the screw-threaded upper end of a vertical post secured in the bore of said tube in such manner as not to obstruct the exit of the steam or water-vapor. The object of cap $e'$ is to obstruct the mouth of tube $e$, so that the steam will issue therefrom with such force as to thoroughly commingle with the oil-vapor generated in chamber D.

Projecting vertically up through a slot made in the bottom of the drip-pan, and open to and made radially from the opening $a$, is the oil-supply pipe E. This pipe E passes up through the bottom of the chamber D, and terminates a slight distance above the same. The side walls of the oil receiving and vaporizing and vapor-mixing chamber D, adjacent to the bottom thereof, are sloped or inclined inward toward the raised central part, and arranged (preferably) on a longitudinal central line near the ends of this chamber D are the hollow bosses $ff$. These bosses $f$ project downward from the inclined portions of the sides of said chamber D, and the inner or upper surfaces of their floors are raised a little above that surrounding the base of the raised center of chamber D, thus forming a gutter around the said raised center, which must be filled with oil before the oil can flow over the floors of the bosses *f* and down through the eduction-pipes F F into the drip-pan. These eduction-pipes F pass vertically downward from the bosses *f*, (into a hole in which their upper ends are screwed,) and are provided at their lower ends with T-couplings *g g*, which rest upon the plane surfaces *a²* of the drip-pan A. Connected to and extending laterally from the horizontal arms of the couplings *g* are the jets G, which have orifices in their upper sides near their extremities. In the vertical arm of one or both of the couplings *g*, I place a valve, H, so that if the heat generated by the supply from both eduction-pipes of gas is too great one can be closed.

The top of the mixing-chamber D is closed and rendered air-tight by a suitable plate made integrant with the side walls. Secured to and projecting from the top of said chamber D is a flat ring-shaped deflector, J, whose edges extend out to or slightly beyond the vertical plane of the casing B.

In operating my vapor-burner, I first turn on the oil, by means of a suitable valve in the oil-supply pipe, which rises into and fills the gutter in the bottom of the chamber D, surrounding the raised center thereof, and then flows onto the floor of the bosses *f*, down through the eduction-pipes and jets and into the drip-pan. When a sufficient quantity of oil has flowed into the drip-pan, it is ignited. The heat created by the combustion of the oil in the pan soon vaporizes the water in chamber C and the oil in chamber D. The water-vapor or steam rises through tube *e*, and is deflected by cap *e'* into the oil-vaporizing chamber, and, commingling with the oil-vapor, forms a gas, which passes down through the eduction-pipes, out through the jets into the combustion-chamber formed above the drip-pan, within the casing B, and below the oil-vaporizing chamber D. As this gas issues from the jets, it is ignited by the flames arising from the remaining oil in the drip-pan, and burns with an intense heat. When the oil in chamber D begins to vaporize, it ceases to flow down through the eduction-pipes, and the oil, at any time after it commences to vaporize, and, in fact, at any time after the apparatus is set in operation, will not more than fill the gutter surrounding the raised center of the mixing-chamber; and thus a smaller quantity of oil is always in this chamber than in the chamber of other vapor-burners, and consequently it vaporizes sooner. The reason the central portion of the mixing-chamber, to which the escape-tube of the water-vaporizing chamber is connected, is raised is to prevent the oil from flowing into the water-chamber. The sides of chamber D are inclined inward, so that the oil may gravitate toward the raised central part. Thus, as the vapors arise from the heated oil, they will be in close proximity to the escaping jet of steam, and thus facilitate the commingling of the two. Another feature of these inclined sides is, that they deflect the flames and heat out between the upper edges of the casing B and the deflector J.

What I claim as new, and desire to secure by Letters Patent, is—

1. The combination, in a vapor burner, with a water-vaporizing chamber having a suitable water-supply pipe connected thereto, of an oil receiving and vaporizing and vapor-mixing chamber having an oil-supply pipe connected therewith, having the lower portion of its side walls adjacent to its bottom inclined inward, and having hollow bosses extending downward from the inclined side walls, to which the eduction-pipes are connected.

2. In a vapor-burner, the combination, with a water-vaporizing chamber, water-supply pipe connected thereto, and escape-tube, of an oil receiving and vaporizing and vapor-mixing chamber having a raised central portion, the central portion of its bottom to which said water-vaporizing chamber is connected raised above the plane of the surrounding bottom thereto, and the eduction-pipes leading therefrom.

3. In a vapor-burner, the combination, with a drip-pan, A, casing B, and chamber D, of a water-vaporizing chamber and shield *d*, surrounding said chamber, as and for the purpose set forth.

4. In a vapor-burner, the combination, with a water-vaporizing chamber, C, tube *e*, and cap *e'*, of the mixing-chamber D and eduction-pipes F F.

In testimony that I claim the foregoing as my own I hereunto affix my signature in presence of two witnesses.

EDMOND C. PECK.

Witnesses:
JAMES H. COYNE,
FRANK D. THOMASON.